(12) United States Patent
Frank et al.

(10) Patent No.: US 11,973,290 B2
(45) Date of Patent: Apr. 30, 2024

(54) INSTALLATION ELEMENT FOR SOCKET ELEMENTS

(71) Applicant: Berthold Kalkus, Rennerod (DE)

(72) Inventors: Hans-Peter Frank, Kunzelsau (DE);
Berthold Kalkus, Rennerod (DE)

(73) Assignee: Berthold Kalkus, Rennerod (DE)

( * ) Notice: Subject to any disclaimer, the term of this patent is extended or adjusted under 35 U.S.C. 154(b) by 217 days.

(21) Appl. No.: 17/413,522

(22) PCT Filed: Dec. 10, 2019

(86) PCT No.: PCT/DE2019/000327
§ 371 (c)(1),
(2) Date: Jun. 11, 2021

(87) PCT Pub. No.: WO2020/119845
PCT Pub. Date: Jun. 18, 2020

(65) Prior Publication Data
US 2022/0029344 A1 Jan. 27, 2022

(30) Foreign Application Priority Data
Dec. 13, 2018 (DE) .................. 10 2018 009 948.3

(51) Int. Cl.
*H01R 24/76* (2011.01)
*H01R 13/453* (2006.01)
(Continued)

(52) U.S. Cl.
CPC ......... *H01R 13/4532* (2013.01); *H01R 24/76* (2013.01); *H02G 3/081* (2013.01); *H02G 3/185* (2013.01)

(58) Field of Classification Search
CPC .... H01R 13/52; H01R 13/4532; H01R 13/64; H01R 13/453; H01R 13/6397
See application file for complete search history.

(56) References Cited

U.S. PATENT DOCUMENTS

| 4,511,198 A | * | 4/1985 | Mitchell | H02G 3/185 439/131 |
| 4,770,643 A | * | 9/1988 | Castellani | H02G 3/185 174/67 |

(Continued)

FOREIGN PATENT DOCUMENTS

| DE | 69814632 T2 | 3/2004 |
| DE | 10201202553 A1 | 6/2013 |

(Continued)

OTHER PUBLICATIONS

International Search Report.
(Continued)

*Primary Examiner* — Truc T Nguyen
(74) *Attorney, Agent, or Firm* — Ralph E. Jocke; WALKER & JOCKE

(57) ABSTRACT

An apparatus provides temporary electrical connections to electrically powered devices. Exemplary arrangements include a base housing (01) that includes a socket (02) therein. Such a socket releasably engages electrical plugs to deliver household current, or may include USB ports or other types of sockets that releasably engage electrical connectors. A housing top cover (10) includes a socket access opening (11) that is in corresponding aligned relation with the socket. A rotatable plate (30) is positioned in underlying relation of the housing top cover and is rotatable in operative supported connection with the base housing. The rotatable plate includes at least one plate opening. The plate is selectively rotatable responsive to manual actuation of a button, between a socket blocked position in which an outer face of the plate blocks access through the socket access opening, and a socket access position in which the plate opening is in corresponding aligned relation with each of the socket and the socket access opening.

20 Claims, 13 Drawing Sheets

(51) Int. Cl.
*H02G 3/08* (2006.01)
*H02G 3/18* (2006.01)

(56) References Cited

U.S. PATENT DOCUMENTS

| | | | | |
|---|---|---|---|---|
| 6,234,812 | B1 * | 5/2001 | Ivers | H01R 25/006 |
| | | | | 439/378 |
| 6,551,130 | B2 * | 4/2003 | Bonilla | H01R 13/74 |
| | | | | 439/535 |
| 7,275,942 | B1 * | 10/2007 | Wu | H01R 13/4532 |
| | | | | 174/67 |
| 7,946,864 | B1 * | 5/2011 | Neyens | H01R 24/76 |
| | | | | 439/131 |
| 8,242,365 | B2 * | 8/2012 | Galasso | H02G 3/185 |
| | | | | 174/67 |
| 9,705,298 | B2 * | 7/2017 | Dinh | H02G 3/081 |
| 10,770,875 | B2 * | 9/2020 | Byrne | H01R 24/64 |
| 11,038,331 | B1 * | 6/2021 | Baldwin | H01R 13/447 |
| 11,088,516 | B1 * | 8/2021 | Baldwin | H01R 13/518 |
| 2017/0077691 | A1 * | 3/2017 | Zheng | H02G 3/185 |
| 2021/0151968 | A1 * | 5/2021 | Oliver | H01R 13/447 |

FOREIGN PATENT DOCUMENTS

| | | |
|---|---|---|
| DE | 202015103222 U1 | 7/2015 |
| DE | 102013000829 A1 | 7/2017 |

OTHER PUBLICATIONS

Written Opinion.
English Translation—International Search Report.
English Translation—Written Opinion.

* cited by examiner

A-A ( 1 : 1 )

A-A ( 1 : 1 )

INSTALLATION ELEMENT FOR SOCKET ELEMENTS

TECHNICAL FIELD

Exemplary arrangements relate to apparatus that provide temporary releasable electrical connections.

BACKGROUND

Sockets as electrical installation equipment are used as part of the building installation technology and are generally mounted at a fixed location. They provide the voltage for electrically powered devices which consume electricity. Sockets in worktops, such as kitchen countertops, are often only made accessible for the duration of the use thereof. To perform work in the kitchen or for visual as well as safety-relevant reasons, the sockets are often covered. To connect the devices, the sockets can usually be opened for access. When open, the voltage connections protrude from the countertop, into which they are installed, and are thus visible. In this position, the connections can be connected to the socket insert. This has the disadvantage that the socket housing and the connections are arranged on the countertop, for example a kitchen countertop, so as to always be visible. Depending on the area and purpose of application, the sockets can be covered by means of the above-mentioned hinged covers in order to avoid the entrance of foreign objects and also in order to prevent unauthorized access.

DE 24 58 243 A1 discloses a protective device for installation elements, such as sockets and switches, comprising an automatically closing cover flap, which covers the installation element so as not to be accessible. A rotatable cover plate comprising a safety bolt is arranged at the cover flap, by means of which safety bolt the opening of the cover flap is made possible in that the safety bolt can be brought into operative and inoperative position by rotating the cover plate.

Devices, which can be pivoted out of a countertop or the floor and which are embedded, for example, underneath the countertop, are known as well. The opening of the cover is required for activation purposes and to access sockets therein.

DE 202 09 189 U1 discloses an under floor distribution box for electrotechnical purposes comprising a cover and a cord outlet comprising a closing flap, which can be pivoted around a cover-side pivot axis into an open position, wherein the closing flap has a lever underneath the cover, and a push button can be activated, so that the lever and thus the closing flap can be pivoted into an open position by pushing the push button.

It is a disadvantage of the known coverings that the covers protrude beyond the remaining components, for example of the piece of furniture, into which sockets are to be integrated, both in the closed position and in the open position. In addition, movable covers wear out and lose their functionality. Rattling can result.

SUMMARY

Exemplary arrangements described herein provide a covering, which provides for a closable, flat assembly for a socket construction.

An installation element device for electrical connections, that includes in particular sockets that accept electrical connectors of different types, as well as USB or other connections, is disclosed. Said installation element includes in particular a socket element. The device includes a housing outer cover for a base housing, respectively, comprising socket access openings, as well as an inner base housing comprising one or several sockets arranged therein. Different options for covering the sockets will be described below.

The exemplary device has the stationary base housing, and the housing outer cover, comprising a stationary upper housing screen which is alternatively referred to herein as a cover. Openings, which make it possible to access the sockets, are formed in this stationary upper housing screen.

In addition, the device has a rotatable device, by means of which the above-mentioned openings of the housing screen can be opened or closed. The exemplary rotatable device is a rotatable rotary disk, which is alternatively referred to herein as a plate. The rotary disk is arranged at the base housing or an inner housing, which is formed in a stationary manner. Alternatively to the rotary disk, the rotatable device can be formed in any other suitable form, for example as rotary vane, rotary cam, or other movable structure.

The exemplary rotary disk, which is arranged at the base housing or the firmly installed inner housing, can be rotated with respect to the outer, stationary housing outer cover or screen, which is firmly connected to the base housing. The upper housing outer screen of the stationary outer housing cover has size-adapted insertion holes which are alternatively referred to herein as socket access openings for the acceptance of electrical connectors such as plugs of devices that consume electricity respectively, depending on the number of the sockets installed in the base housing. These are usually two or three sockets for each device, thus either a duplex or a triplex arrangement. However, the arrangement of one of or more than three sockets is also possible.

The rotary disk is arranged at the stationary inner base housing in such a way that in this stationary inner housing the individual socket devices are positioned so as to correspond exactly to the corresponding socket access openings of the stationary upper housing outer screen of the outer housing cover, so that the corresponding plugs or electrical connections, respectively, of the electrically powered devices can be inserted into the sockets after the opening through the rotary disk. Only the rotary disk, which is movably secured to the inner base housing, is rotated in such a way that the openings are either covered or open, and the connections, i.e. the sockets, can thus be accessed from outside the stationary outer housing cover. During the non-use of the sockets, the rotary disk can be activated again, and the openings of the stationary upper housing outer cover can be covered, in that the position of the rotary disk is changed in such a way that perforated screens formed at the rotary disk can move into or lock in place with the socket access openings of the housing outer cover, respectively, and the surface of the cover overlying the socket element is thus covered in a planar or flush manner, respectively.

The rotatability of the rotary disk can take place by means of different rotary mechanisms. The exemplary rotary mechanisms can be:

a) A firm inner base housing comprising a movable rotary disk according to the "ballpoint pen principle". On the inner side, the housing outer cover has two fastening domes, which are arranged in such a way that they protrude into the inner base housing and are screwed to the latter. A hollow space, in which the rotary disk is movably arranged, is thus created between the inner base housing and the housing outer cover. In the alternative, the fastening of the housing outer cover to the base housing can also take place by means of screw connections, which are provided radially on the circumference, but also by means of locking connections, which are arranged between cover and base housing. The activation takes place according to the "ballpoint pen principle", wherein an activating device, such as, for example, a button, is formed. Several parts form the covering of the socket. Inside, the rotary disk is rotated around an axis of rotation. A pressure or rotary spring, respectively, is arranged in the lower region of the socket element. The rotary disk is opened through rotation by means of the "ballpoint pen principle". In particular three guide ribs act against in particular, three recesses. The rotary disk is thus released and is pulled downwards in order to unlock the sockets. The rotary spring acts on the axis of rotation with a certain torque. When releasing the button, the latter moves axially in the direction of the top side of the outer housing cover. The pressure spring strikes against this upper region. The opening thus rotates open automatically with respect to the stationary housing outer cover, and the socket can be accessed and used. The button sticks axially out of the cover for activation purposes. The guide ribs are guided in the axis of rotation. The rotary disk is rotated by means of manual activation of the button, and the rotary spring is biased. Due to the play, the button is moved downwards, and the sockets are covered in a flat manner again. In the cooperation of the button with the guide ribs, the rotary disk is guided upwards in its function as cover plate. Two springs can be formed.

b) Another arrangement utilizes helical turns for providing rotary disk rotation. The rotary disk, which is arranged at the firmly arranged inner base housing, can be rotated by means of a rotation sleeve around helical turns, for example two helical turns, and can be rotated, e.g. >90°. By pushing down an actuating button, the rotary disk is released from its locking position, and the rotary spring, which represents a connection under bias with the rotation sleeve and the housing bottom, can relax and rotates the rotation sleeve. An axially movable axis, which engages with the helical turns of the rotation sleeve via moldings, is arranged in the interior of the rotation sleeve. In its interior, the axially movable axis has an angular geometry, which protrudes in a complementary manner from the housing bottom with a molding into the axis. The axis is thus pushed out of the base housing by rotation of the rotation sleeve and brings the actuating button axially outward into a raised position. The rotary disk is likewise rotated from a closed into an open position by means of the rotation of the rotation sleeve via followers, which are arranged at the end of the axis of rotation of the rotary disk and which are engaged with the rotation sleeve. By pushing down the actuating button, the rotation sleeve is rotated in an opposite direction of rotation via the movable axis, the rotary spring is biased, and the rotary disk is rotated into the closed end position. A pressure spring, which is arranged between rotation sleeve and rotary disk, pushes the rotary disk into the locked position. The function of the helix principle is that guide elements, which are engaged with helical turns, convert an axial movement into a rotating movement.

c) An alternative arrangement includes helical turns of another type. A different type of the helical turn principle takes place, as initially described in b), by pushing down the actuating button and by releasing the locking of the rotary disk. The arrangement of the helical turns in the rotation sleeve allows for a rotation of the rotary disk into the respective open or closed position for covering purposes.

In the case of the described helix principle, guide elements in the helical turns of the gate element or of the rotation sleeve lead to the rotation due to an axial degree of freedom. This principle of the helical turns is also usable in that the gate element or the rotation sleeve represent a partial region of the rotary risk or of the activation element.

d) In an alternative arrangement the device is electrically powered. The release of the locking of the rotary disk takes place by pushing down the actuating button against the pressure of a pressure spring, which is arranged between the axial bearing of the rotary disk and an electrical drive. When reaching the bottom dead center which is alternatively referred to as the extent of travel of the actuating button, a switch is activated causing a change in electrical condition which causes a control circuit to turn on the electric motor. The electric motor rotates the rotary disk into the open socket access position and then is stopped via an axial connection by operative connection with a stop. When the rotary disk stops in the socket access position, the current increases, an overload detected by the control circuit sets the switch to off, turns off the delivery of electricity to the motor, and reverses the polarity of the DC motor connections. The pressure spring pushes the rotary disk into a locked position. The closing in which the rotary disk moves to a socket blocked position can take place in the same way as the opening by pushing down the actuating button. The control circuit is designed in such a way that, on the one hand, it realizes the reversal of the direction of rotation and, on the other, hand, represents a clamping protection.

Another type of the rotary disk control in electronic form is the use of an IC timing element. If the locking position of the rotary disk is not reached within a specified time, the electronics reverses the polarity of the DC connections, as a result of which the reversal of the direction of rotation and thus a clamping protection is realized.

In the case of all mentioned rotary mechanisms, a pivotable or rotatable device, respectively, the inside rotary disk or plate formed for this purpose, which is arranged within the stationary base housing, but not an upper covering on the outside of the stationary device is rotated for covering or making accessible, respectively, the sockets formed in the device for providing releasable electrical connections. A releasing and movement of an exposed upper covering is not required. A wear-out or a rattling, respectively, of a movable exposed cover within the insert opening can thus be prevented in the exemplary arrangements.

In alternative exemplary arrangements three springs can also be arranged.

The socket or the sockets, respectively, arranged in the inner base housing serve as electrical plug connectors between conduits such as cords of electrically powered devices. They are used for the electricity supply. The wired electric plug systems form the releasible interface between electrical devices and the current source supplying them. Equipment is usually supplied via sockets with household current of single-phase of 230 Volts or three-phase alternating current (AC current) with 400 Volts, there are also standardized sockets for 12V direct current. A Schuko (protective contact) household socket provides a voltage of 230 V and up to 16 Amperes, thus up to an output of approximately 3680 Watts. If this output is exceeded, the fuse generally turns off. A socket used for the electrical connection for the household current may be connected to a distribution board of the building installation and generally guides one of three outer conductors, the neutral conductor, and the protective conductor. Voltage-conducting sockets with "female" design, which have contact openings facing inwards, are also referred to as bushes or coupling. According to the exemplary arrangements sockets may include, USB connections or the like and can also be integrated in the exemplary arrangements. Socket models, such as socket units of a foreign design, such as, e.g., of Italian, English, French, or also Swiss design, can likewise also be integrated.

The exemplary device providing a coverable socket element is arranged in particular at a kitchen countertop or any other worktop, thus for example a desk or the like. The kitchen countertop refers to the work surface in the kitchen. It is usually firmly mounted and forms the horizontal closure of built-in kitchens for example with a depth of approximately 60 cm and a working height of 85 cm to 110 cm. The kitchen countertop can also be used for so-called island kitchens.

The device according to exemplary arrangements thereby has the advantage that a masking of the openings for sockets, which is secure, can be operated easily, and has a low rate of failure, is attained by means of a simple activation.

Further advantages and advantageous designs of exemplary arrangements can be gathered from the following detailed description, the drawings, and the claims.

BRIEF DESCRIPTION OF DRAWINGS

Exemplary arrangements will be described in more detail below on the basis of the enclosed schematic drawings, in which.

DETAILED DESCRIPTION

Figure 1:
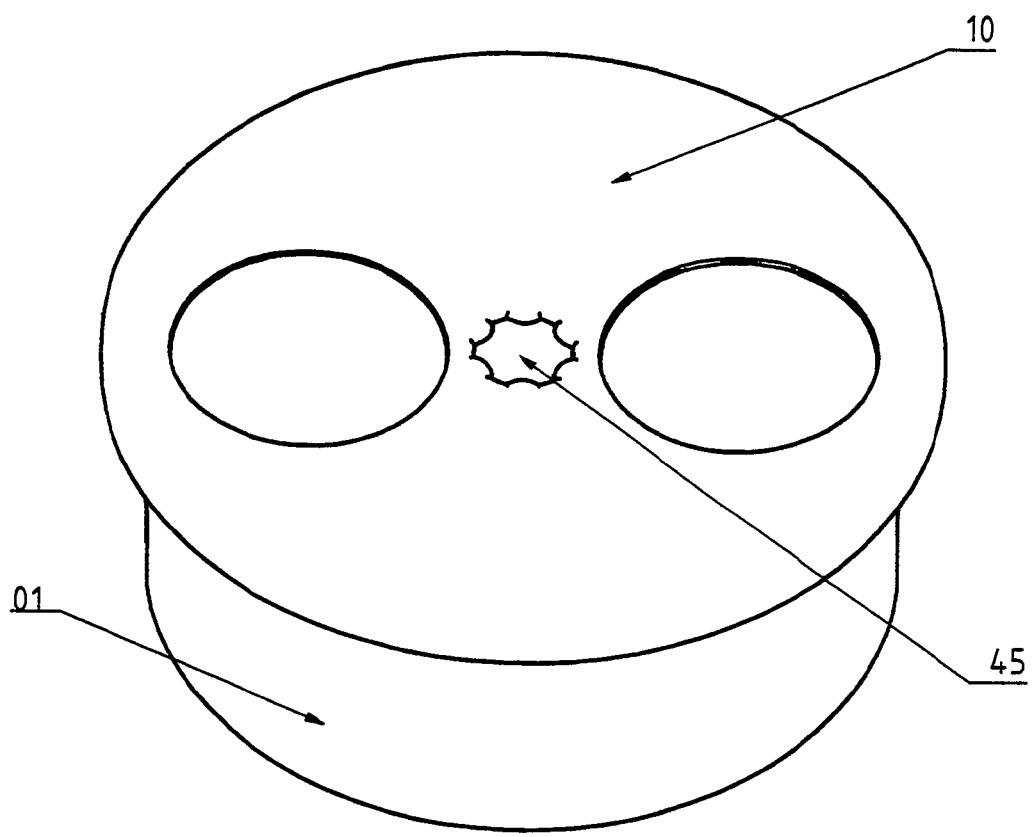
FIG. 1 shows an exemplary device configured to provide temporary releasable electrical connections in an isometric view.

An apparatus configured to provide temporary releasable electrical connections which is sometimes referred to herein as an installation or socket element device, respectively, is illustrated in FIG. 1 as a complete assembly in an isometric view from the outside. In this exemplary first arrangement, the device is formed as duplex. The device has a stationary base housing 01. The base housing 01 is in fixed operative connection with a stationary upper housing screen, the housing top part or housing outer cover 10. An actuating button 45 is arranged approximately in the center of the housing outer cover and is manually engageable on or through the housing outer cover.

Figure 2:
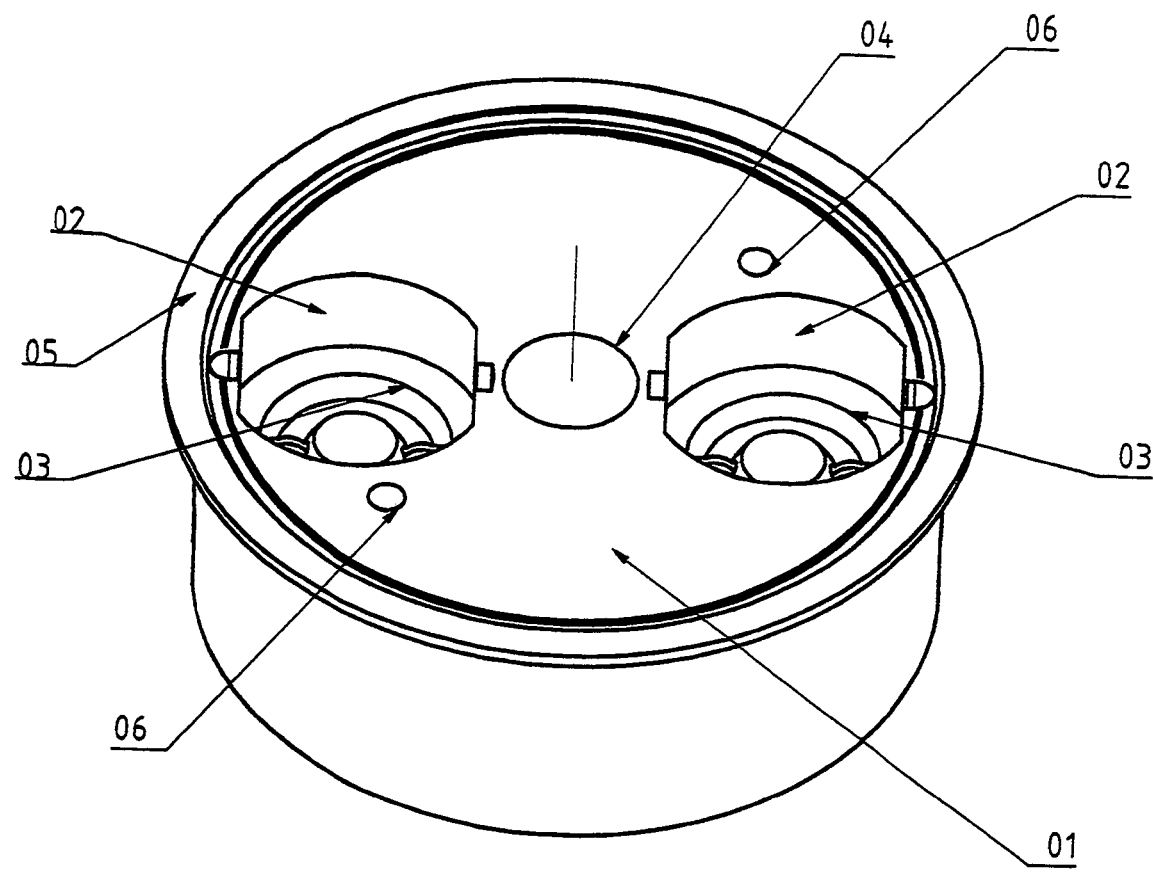
FIG. 2 shows a base housing of a first arrangement in isometric view.

FIG. 2 shows a base housing 01 for the first exemplary arrangement of the description. Socket units 02 are formed or positioned within the base housing 01. Switches and/or USB moldings can also be formed as sockets. At least one socket unit 02 is formed. In addition, a plug insertion aid 03 is formed. A rotary disk is provided and rotationally movably mounted in supported connection in this base housing 01. The rotary disk is arranged via a rotary disk receptacle 04. A support edge 05 is formed. Receiving openings 06 for a fastening of the housing top part 10 are formed.

FIGS. 3 to 10 show the individual components for the first exemplary arrangement of the description. The axially centered actuating button 45 is formed as push button. The housing bottom 20 is illustrated. A spring, which is formed as pressure-rotary spring 59, is positioned there. This pressure-rotary spring 59 is arranged within the base housing 01. A rotary disk 30, on which the pressure-rotary spring 59 acts, is attached to the pressure-rotary spring 59. A pressure spring 58 acts on the rotary disk 30 from the top. The pressure spring 58 can be compressed by means of manual actuation of the actuating button 45 via a rotary sleeve 50. The housing top part 10 is arranged at the top side.

Figure 3:
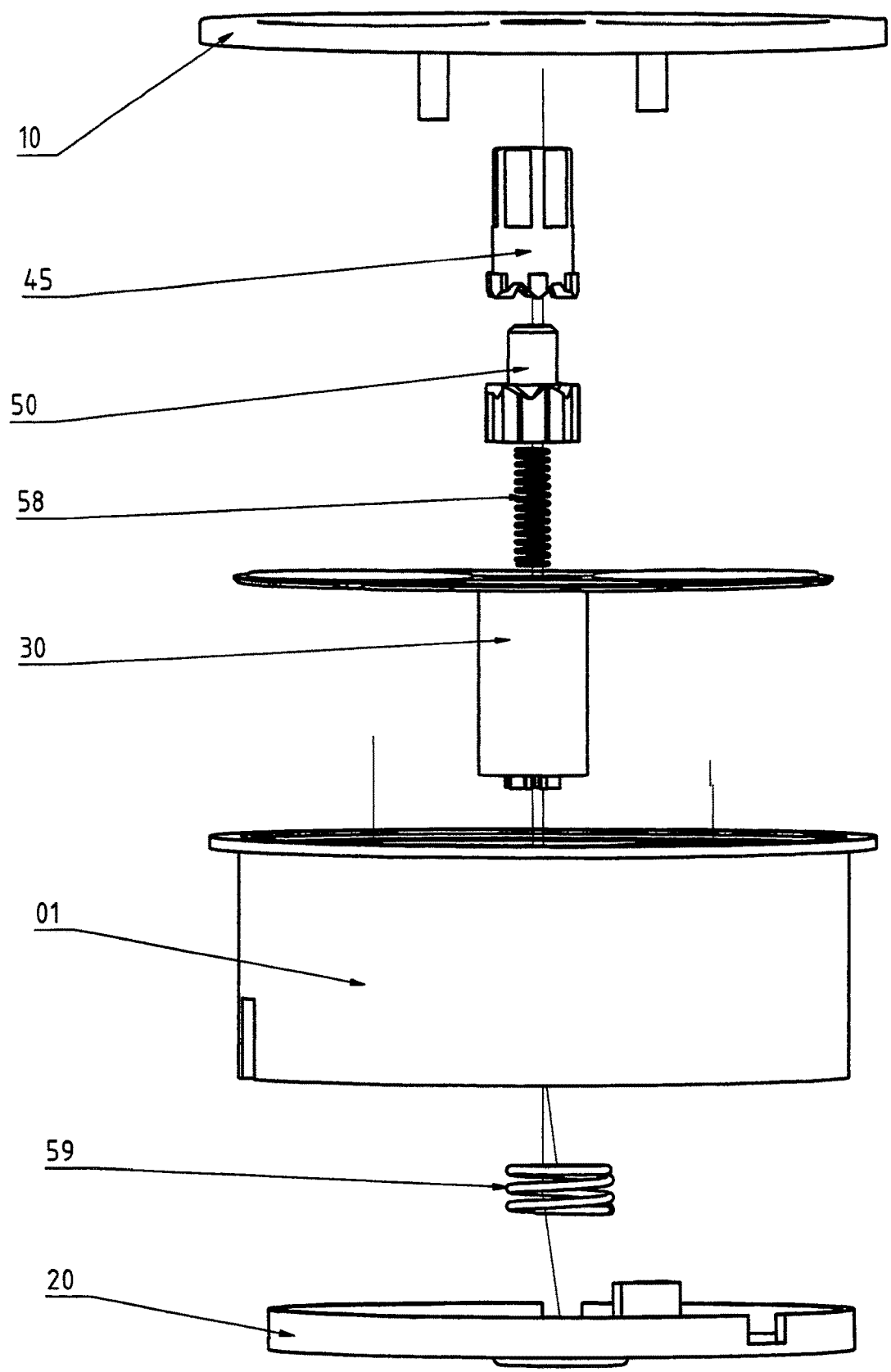
FIG. 3 illustrates individual parts of the exemplary first arrangement in an exploded view.
Figure 4:
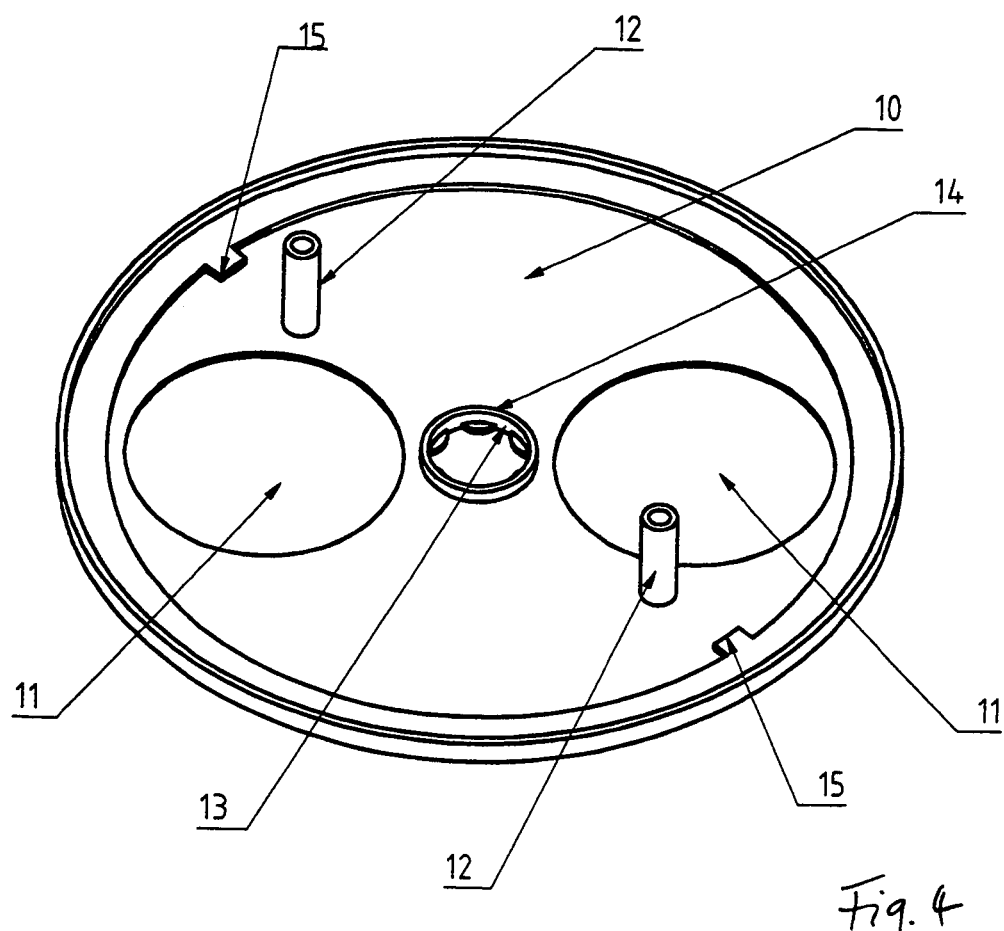
FIG. 4 shows the housing outer cover of the first arrangement in an isometric view.

FIG. 4 shows the housing outer cover or top part 10 comprising the through socket access openings 11. The fastening cylinders or domes 12 described in FIG. 3 are illustrated. The activating device, thus the actuating button 45 from FIG. 3, has a guide 13 and a stop 14. In addition, radial position securing ribs 15 are formed.

Figure 5:
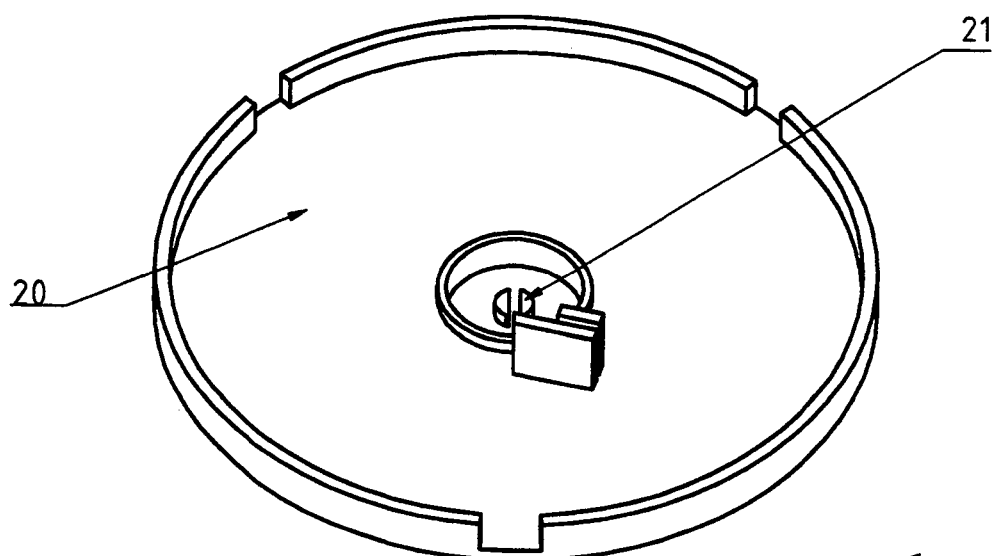
FIG. 5 shows the housing bottom of the first arrangement in an isometric view.

FIG. 5 shows the base housing bottom 20 comprising the rotary-pressure spring receptacle 21.

Figure 6:
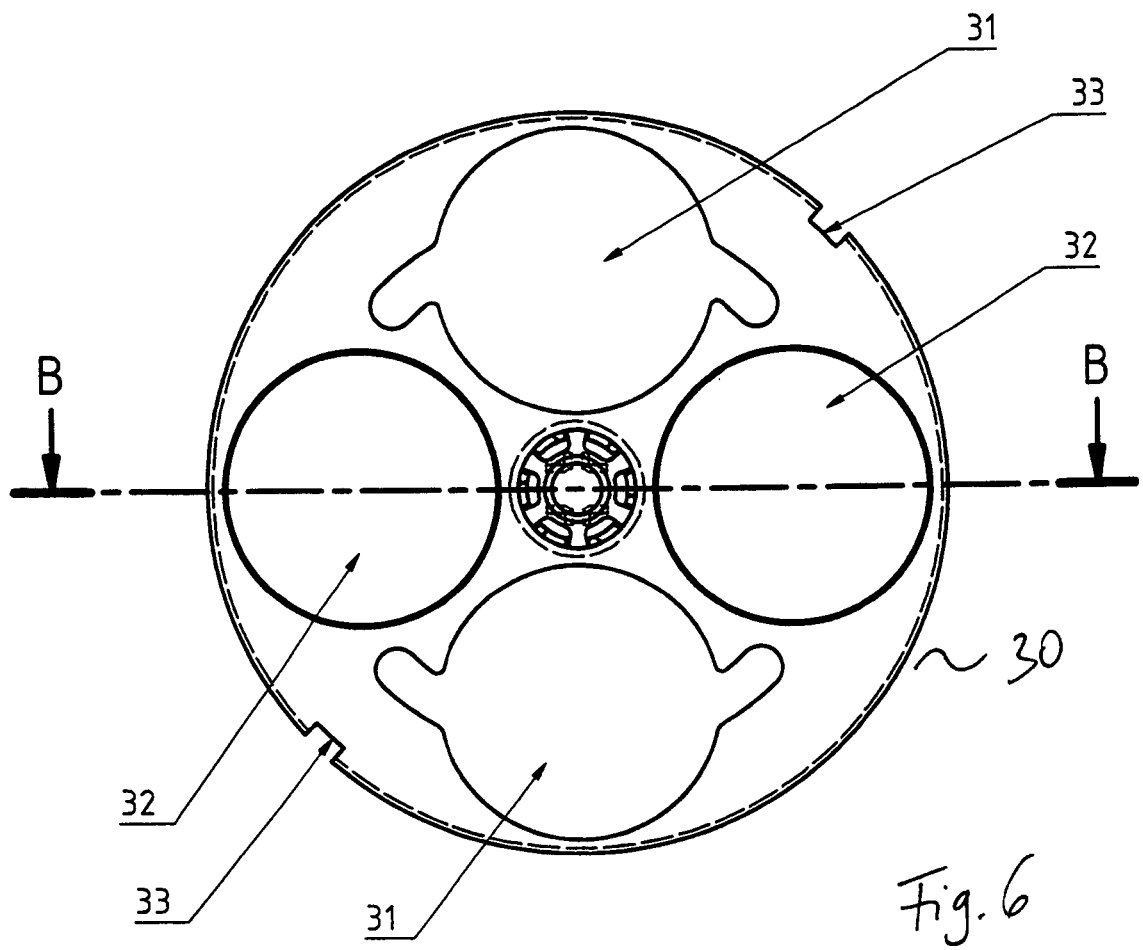
FIG. 6 shows a rotary disk of the first arrangement in a top view.
Figure 7:
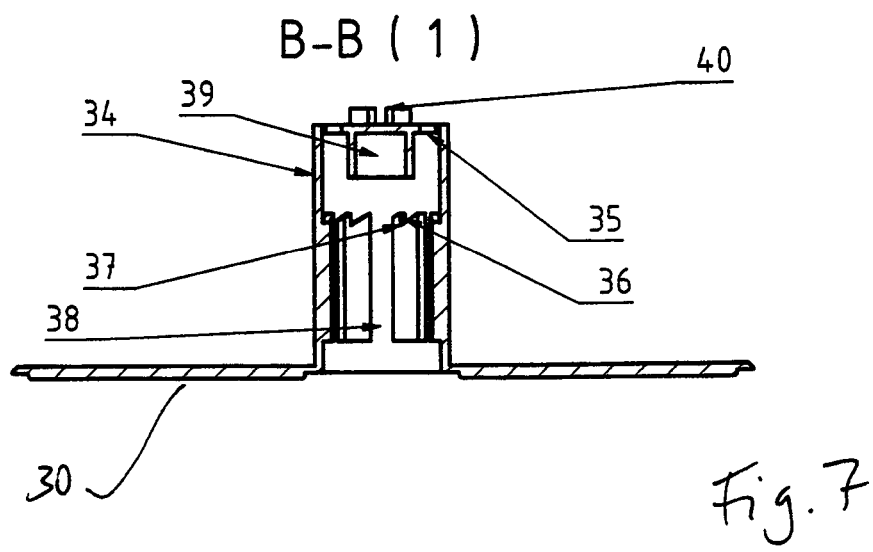
FIG. 7 shows the rotary disk of the first arrangement in a sectional view.

The rotary disk 30 which is alternatively referred to as a plate is illustrated in FIG. 6. The rotary disk 30 has at least one through openings 31 which are alternatively referred to herein as plate openings. Perforated screens 32 are formed on an outer face of the plate. The perforated screens 32 can be rotated away from the socket access openings of the housing top part 10 and can be rotated towards the openings again. As shown in FIGS. 6 and 7 the perforated screens may comprise cylindrical projections that extend upward on the plate outer face and extend in the socket access openings in the housing outer cover. Position securing grooves 33 are located on the exemplary plate opposite one another.

FIG. 7 shows the rotary disk 30 comprising an axial enveloping body 34 and a pressure surface 35 for the axial deflection. A control gate 36 is formed. Reference numeral 37 refers to an axial holding position. In addition, a through duct 38 is formed. A rotary spring receptacle 40 is formed in the direction of the pressure-rotary spring 59.

Figure 8:
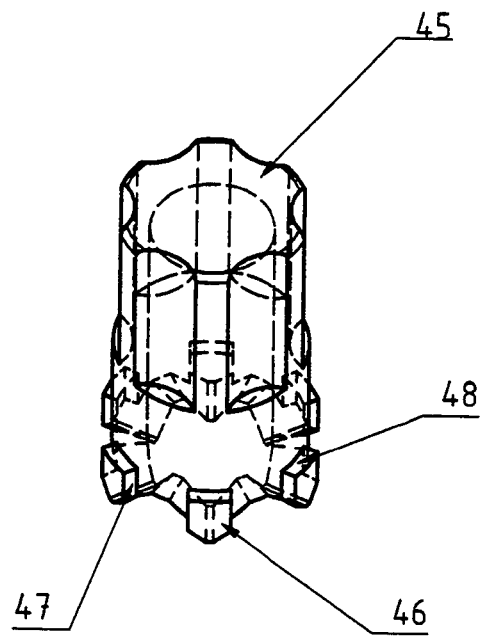
FIG. 8 shows an actuating button of the first arrangement in an isometric view.

FIG. 8 shows the exemplary actuating button 45 comprising control segments 46, a follower shoulder 47 for the pressure spring 58, as well as comprising a stop plane 48.

Figure 9:
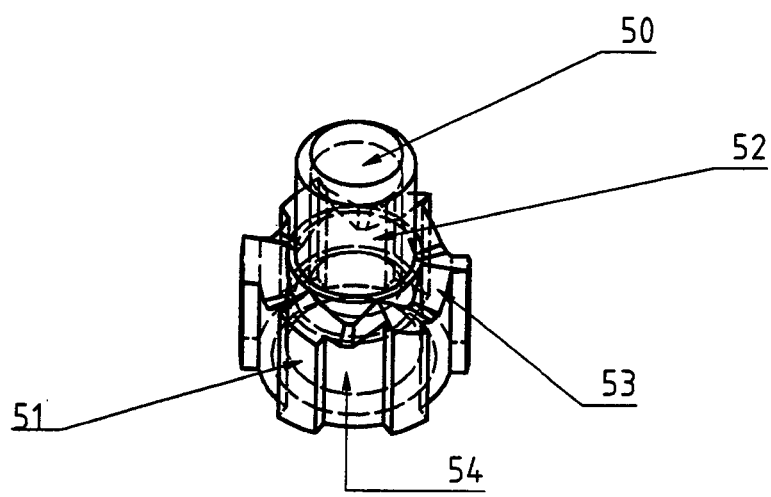
FIG. 9 illustrates the rotary sleeve of the first arrangement in an isometric view.

FIG. 9 shows the exemplary rotary sleeve 50 comprising guide ribs 51, guide pins 52, a control segment receptacle 53, and a guide bore 54.

Figure 10:
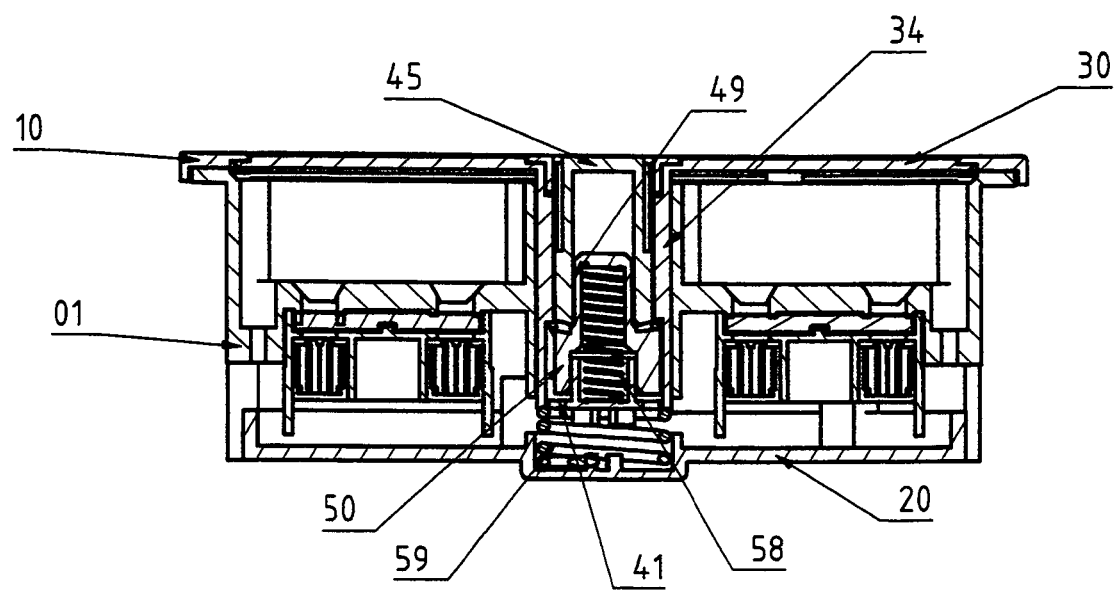
FIG. 10 shows the first exemplary arrangement in a sectional view.
Figure 11:
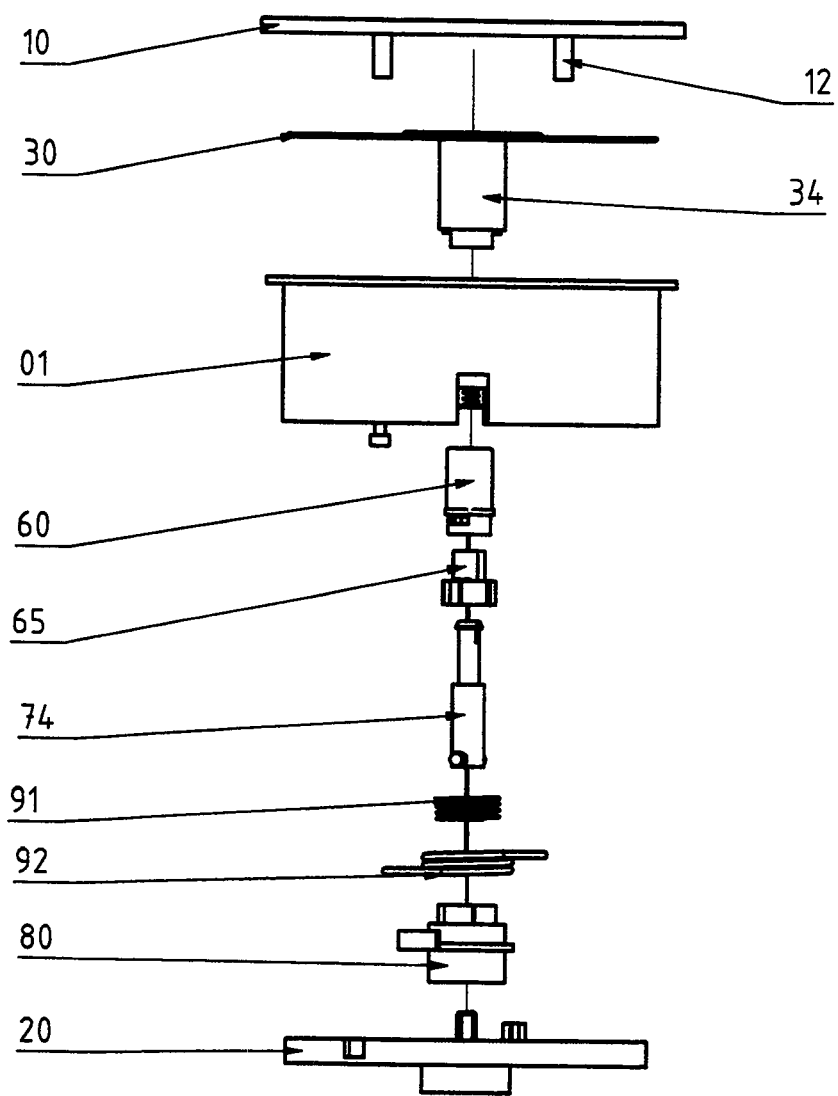
FIG. 11 illustrates the individual parts of an exemplary second arrangement in an exploded view.

FIG. 10 shows the complete assembly of the first arrangement in section. In particular the pressure spring 58 as well as the pressure-rotary spring 59 are illustrated. Force is exerted on the pressure spring 58 via axial movement of the actuating button 45 toward the base housing. A rotary sleeve guide 49 is formed within the axial enveloping body 34. A support surface 41 for the rotary sleeve 50 is formed. The rotary disk 30 can be put into motion by means of the activation of the button and can be rotated with respect to the housing outer cover, top part 10.

In the case of the second exemplary arrangement elements having similar functions are described using the same reference numbers as in the first arrangement. The movable rotary disk 30, which is activated according to the "ballpoint pen principle", is thus arranged. On the inner side, for example, the base housing 01 has in particular two fastening domes 12, which are arranged in such a way that they protrude into the inner housing 07 and are screwed thereto. A hollow space, into which the rotary disk 30 is movably arranged, is thus created between inner housing 07 and the base housing 01. The activation takes place according to the "ballpoint pen principle", wherein an activating device, such as, for example, the actuating button 45, is formed. Several parts form the cover of the socket. Inside, the base housing the rotary disk 30 is rotated around an axis of rotation. The pressure or rotary spring 59, respectively, is arranged in the lower region of the device. The rotary disk 30 is opened through rotation by means of the "ballpoint pen principle". In particular three guide ribs 51 act against in particular three recesses. The rotary disk 30 is thus released and is pulled downwards in order to unlock and enable access to the sockets. The rotary spring 59 acts on the axis of rotation with a certain torque. When releasing the actuating button 45, the latter moves in the direction of the top side of the outer housing 01. The pressure spring 58 strikes against this upper region. The plate opening thus rotates open into corresponding aligned relation automatically with respect to the socket in the stationary base housing 01, and housing outer cover 10, and the socket can be accessed and used. The actuating button 45 sticks out for activation purposes—as in the case of a ballpoint pen. The guide ribs 51 are guided in the axis of rotation. The rotary disk 30 is rotated by means of the actuating button 45, and the rotary spring 58 is biased. Due to the axial play, the actuating button 45 is enabled to be moved downwards, the plate rotates from the socket access position to the socket blocked position and the sockets are covered in a flat manner again. In the cooperation of the actuating button 45 with the guide ribs 51, the rotary disk 30 is guided upwards in its function as cover plate. Two springs 58, 59 can be formed. The rotary disk 30 has plate openings, which correspond with the through socket access openings of the housing top part 10 in such a way that they can be rotated into an open socket access position or a socket blocked closed position by activating the actuating button 45.

FIGS. 11 to 19 illustrate the individual parts of an exemplary third arrangement from the description in exploded illustration. Again some reference numerals common to similarly functional elements in prior arrangements are used. A helical gate 80 is arranged on the housing bottom 20. A rotary spring 92 is attached to said helical gate. Said rotary spring is acted on by a pressure spring 91 of the actuating button 60. A central axis body 74 is arranged thereon. A sliding body 65 is arranged thereon. The actuating button 60 can slide along said slide body. The actuating button 60 serves to activate the rotary disk 30 or the axial enveloping body 34 thereof, respectively. The device is covered by means of the housing outer cover alternatively referred to as top part 10, which has fastening domes 12.

Figure 12:
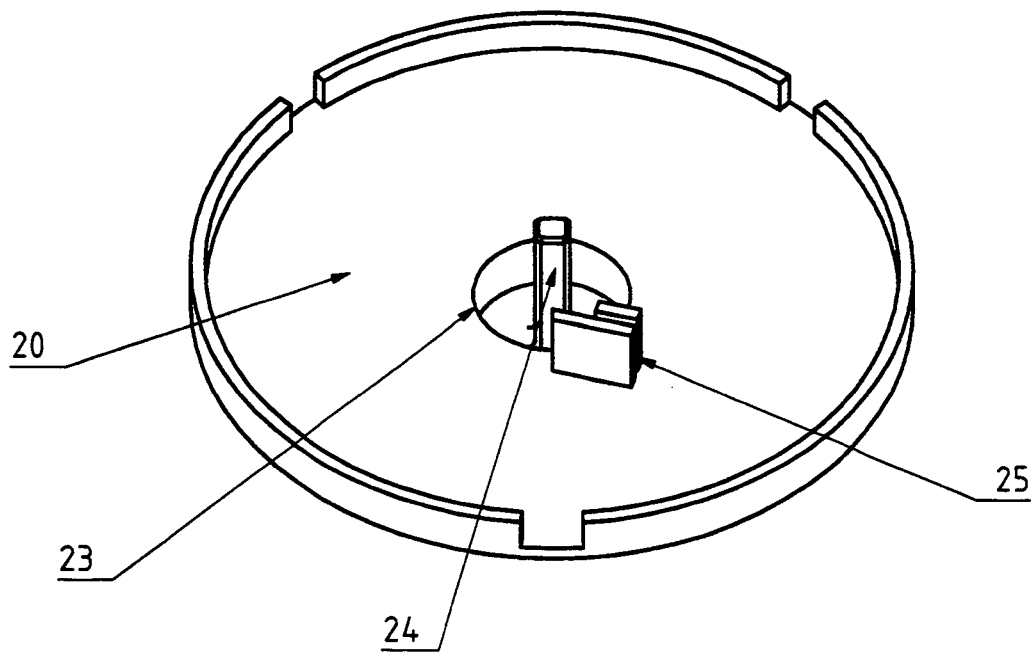
FIG. 12 shows the housing bottom of the second arrangement in an isometric view.

FIG. 12 shows the housing bottom 20 comprising a helical gate receptacle 23, a perpendicular inner axial guide 24 and a rotary spring receptacle 25.

Figure 13:
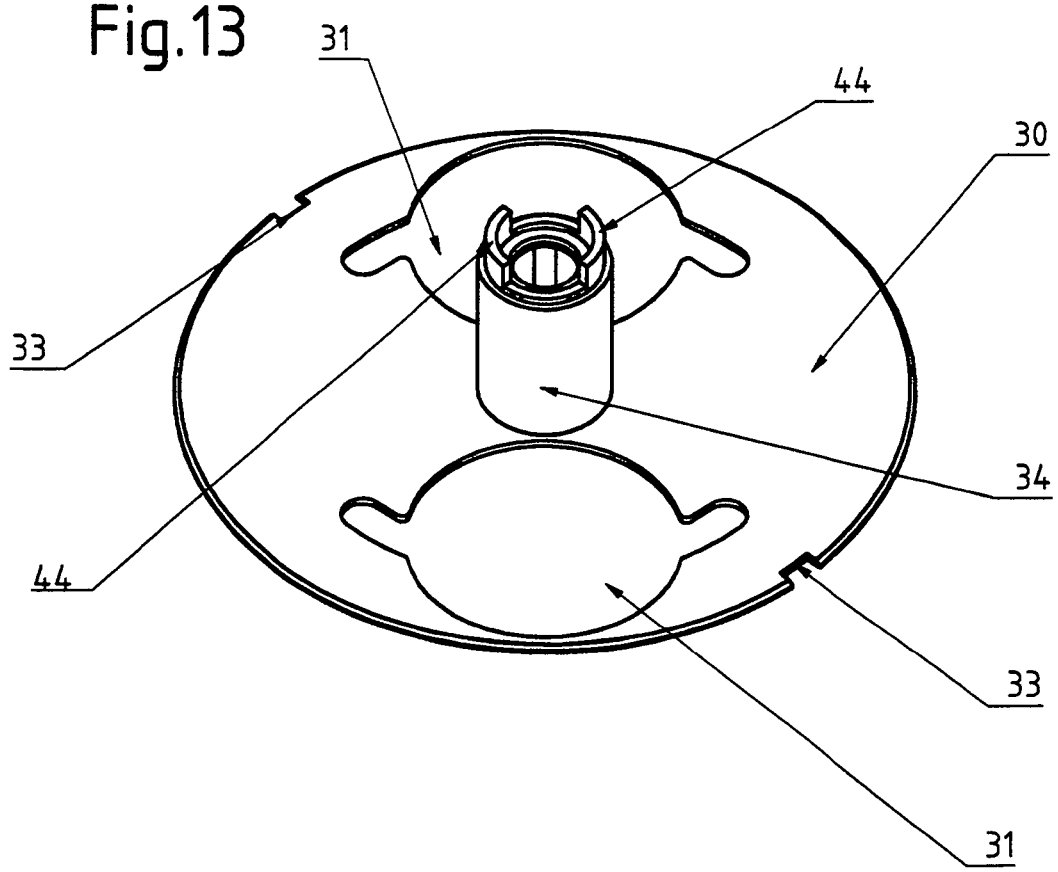
FIG. 13 shows the rotary disk of the second arrangement in an isometric bottom view.

FIG. 13 illustrates the rotary disk 30. Through openings 31 for releasing the socket or USB, respectively, or further connections are formed. Follower moldings 44 are formed at the axial enveloping body 34. Position securing grooves 33 are introduced at the rotary disk 30.

Figure 14:
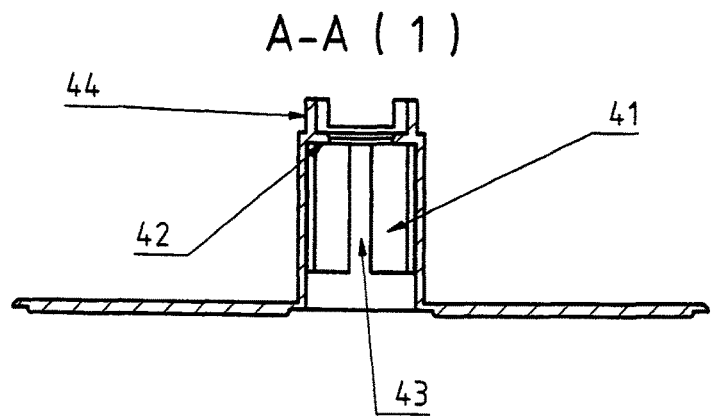
FIG. 14 illustrates the rotary disk of the second arrangement in a sectional view.

FIG. 14 illustrates the rotary disk 30 alternatively referred to as a rotatable plate. A guide surface 41 for the actuating button 60 is formed. The guide surfaces 41 are limited by the pressure surface 42 for the axial deflection. The follower moldings 44 are visible in section.

Figure 15:
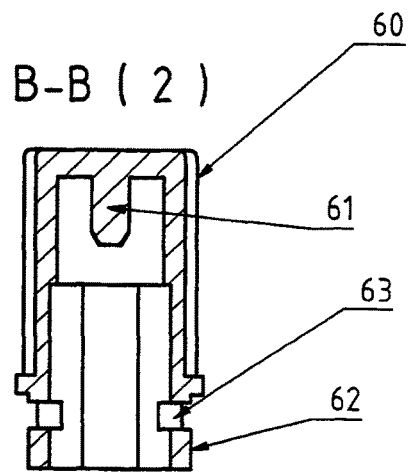
FIG. 15 shows the actuating button of the second arrangement in an isometric view.
Figure 16:
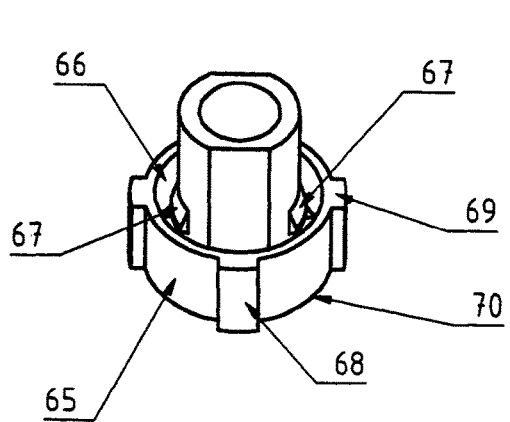
FIG. 16 illustrates a sliding body in an isometric view.

FIG. 15 shows the actuating button 60 comprising a pressure spring guide 61, the receptacle for the sliding body 52, as well as a recess for the locking of a slide body 65, see FIG. 16.

FIG. 16 illustrates the slide body 65. A receptacle 66 for the actuating button 60 as well as locking lugs 67 for the actuating button 60 is formed. In addition, guide ribs 68 are formed. The stop plane 69 for the housing top part 10 as well as the stop plane 70 for the central axis body 74 is likewise illustrated.

Figure 17:
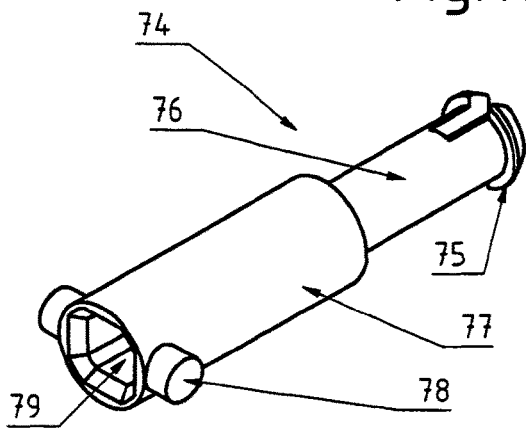
FIG. 17 shows a central axis body in an isometric view.

FIG. 17 shows the central axis body 74 with its locking geometry 75. A cylindrical guide 76 is formed in the slide body 65 and a further cylindrical guide 77 is formed in the helical gate 80. The central axis body 74 has a pin molding 78 as well as the inner axial guide 79.

Figure 18:
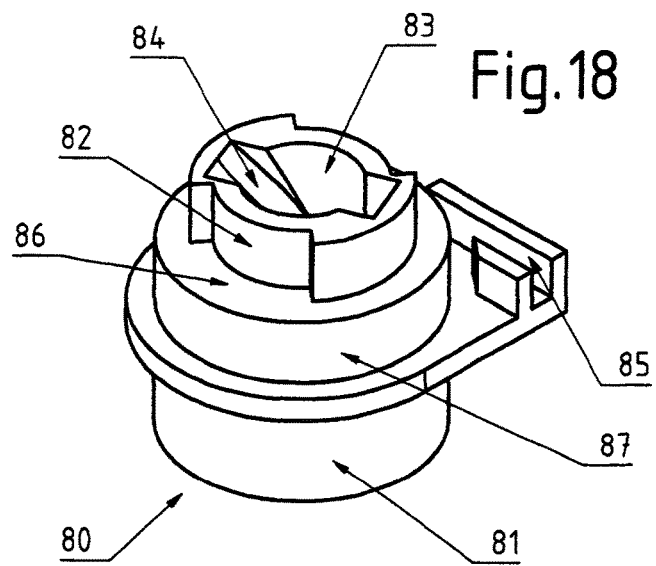
FIG. 18 illustrates a helical gate in an isometric view.

FIG. 18 shows the helical gate 80 comprising a rotary guide wall 81, a follower receptacle 82, a central axis body guide 83, a helical guide 84, a rotary spring receptacle 85, as well as a pressure spring stop 86 and a rotary spring guide 87.

Figure 19:
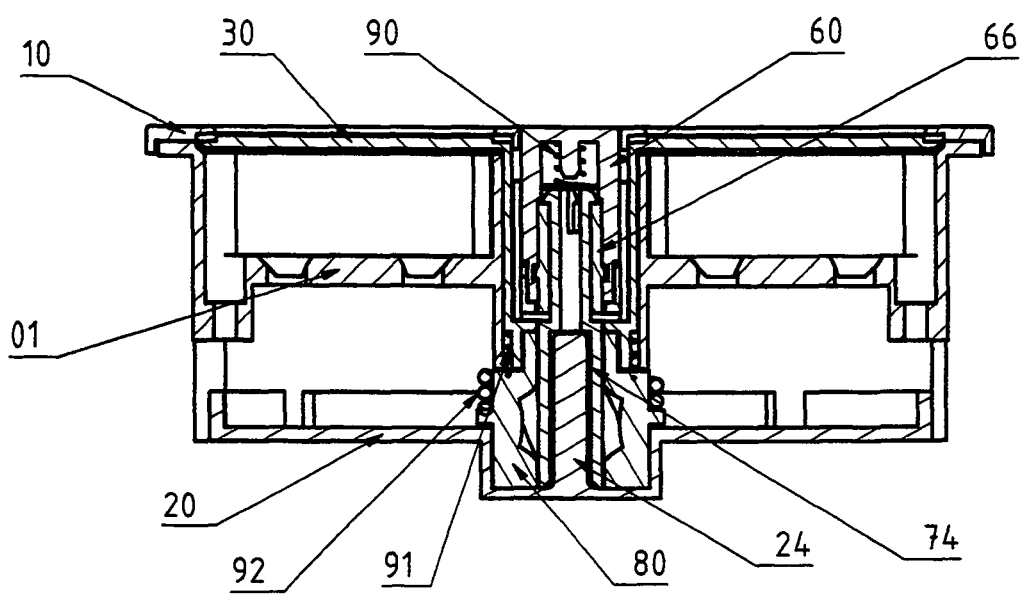
FIG. 19 shows the device of the second arrangement as a complete assembly in a sectional view.

FIG. 19 shows the helical gate 80 in a complete view with the helical gate 80, as well as with a pressure spring 90 for the actuating button 60, a pressure spring 91 for the rotary disk 30, as well as a rotary spring 92 for the rotary disk 30.

The rotation of the rotary disk 30 takes place via helical turns. The rotary disk 30, which is arranged, for example, at a firmly arranged inner housing or—as illustrated—within the base housing 01 with vertical and rotational play for the freedom of movement, can be rotated by means of a rotation sleeve around helical turns of the helical gate 80, for example two helical turns, and can be rotated, e.g. >90°. By pushing axially down on the actuating button 60, the rotary disk 30 is released from its locking position, and the rotary spring 92, which represents a connection under bias with the rotation sleeve and the housing bottom 20, can relax and rotates the rotation sleeve. An axially movable axis, which engages with the helical turns of the rotation sleeve via moldings, is arranged in the interior of the rotation sleeve. In its interior, the axially movable axis has an angular geometry, which protrudes in a complementary manner from the housing bottom 20 with a molding into the axis. The axis is thus pushed out of the base housing 01 by rotation of the rotation sleeve and brings the actuating button 60 into a raised axially outward extending position. The rotary disk 30 is likewise rotated from a closed socket blocked position into an open socket open position by means of the rotation of the rotation sleeve via followers 09, which are arranged at the end of the axis of rotation of the rotary disk 30 and which are engaged with the rotation sleeve. By pushing down the actuating button 60, the rotation sleeve is rotated in an opposite direction of rotation via the movable axis, the rotary spring 30 is biased, and the rotary spring 92 is rotated into the closed end position. A pressure spring 91, which is arranged operatively between the rotation sleeve and the rotary disk 30, pushes the rotary disk 30 into the locked position. The rotary disk 30 has plate openings, which correspond with the through socket recess openings of the housing top part 10 in such a way that they can be rotated into an open or closed position by activating the actuating button 60.

Figure 20:
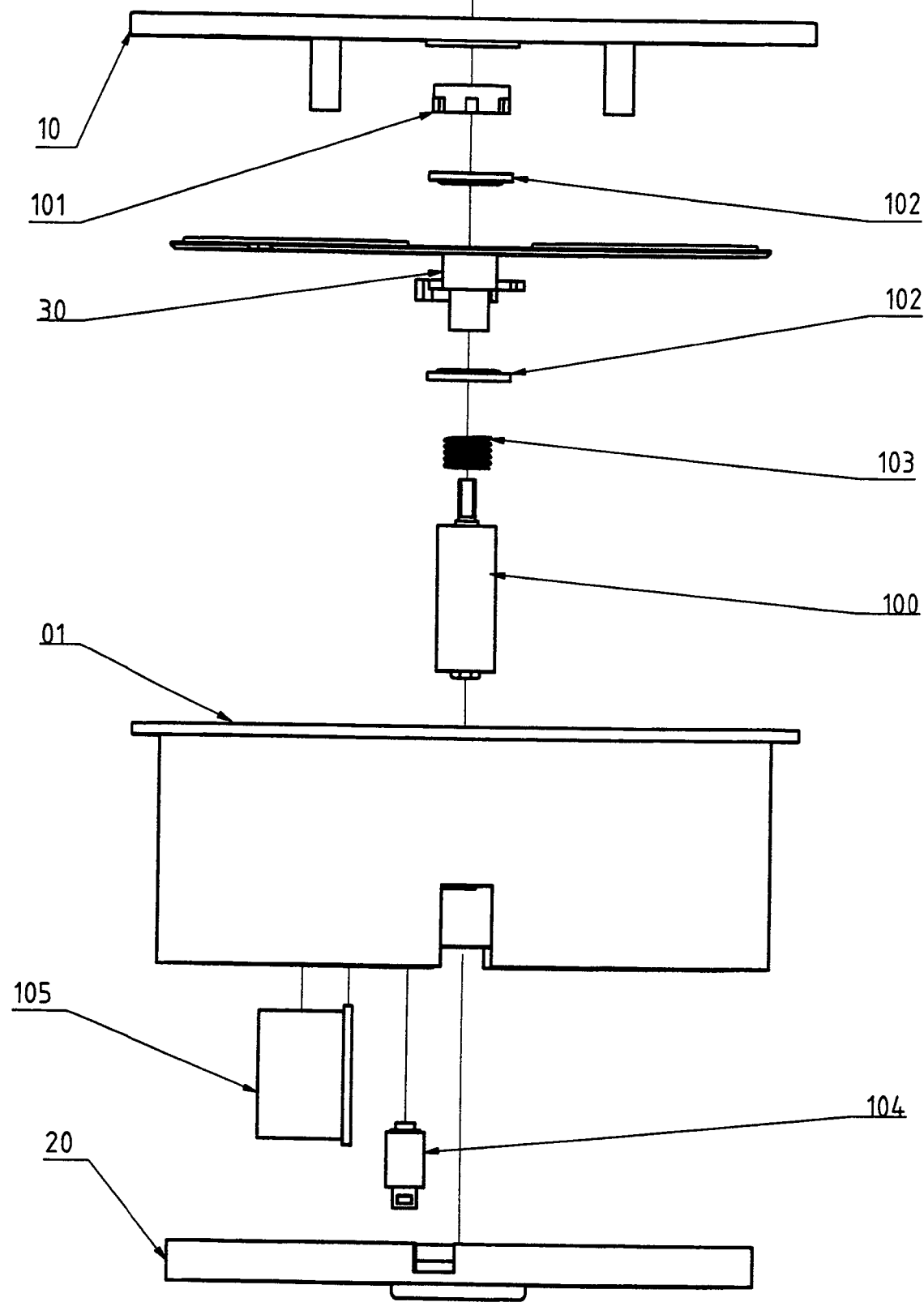
FIG. 20 shows the complete assembly of a third exemplary arrangement comprising an electric motor in an exploded view.
Figure 21:
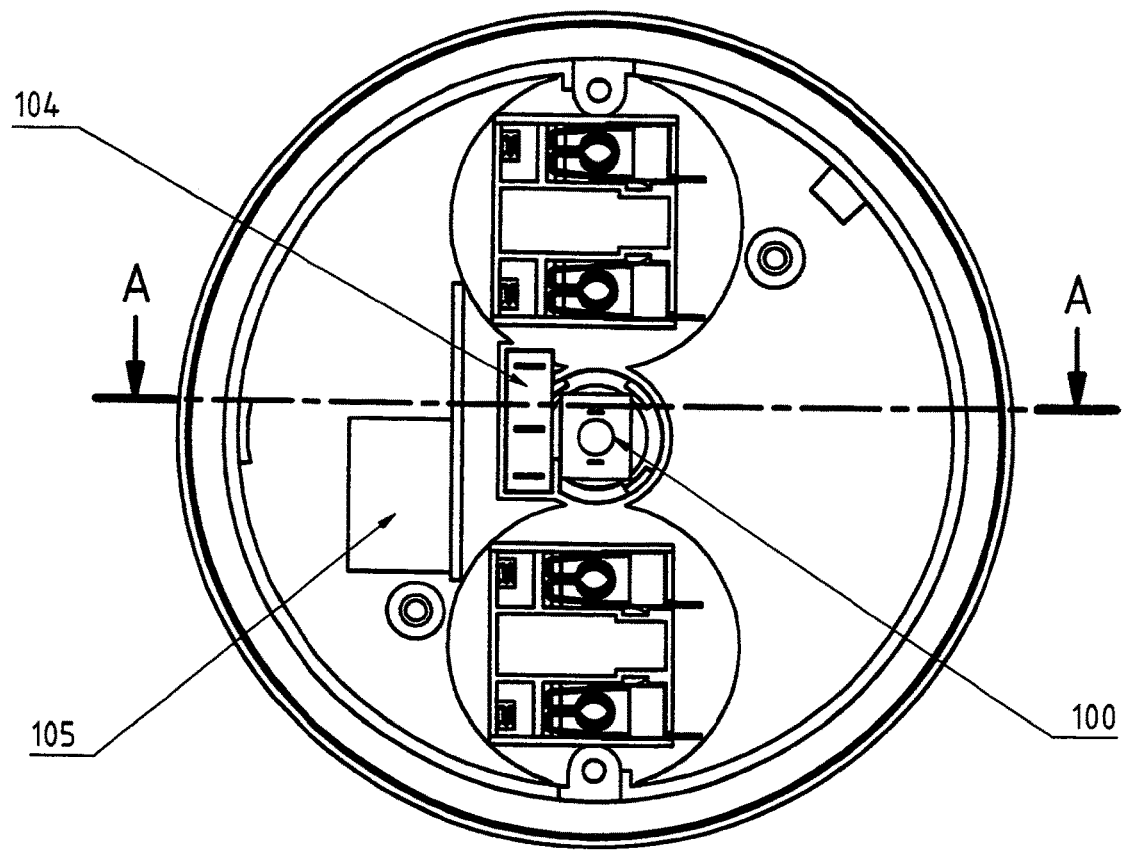
FIG. 21 illustrates the complete assembly of the third arrangement comprising an electric motor in a bottom view.
Figure 22:
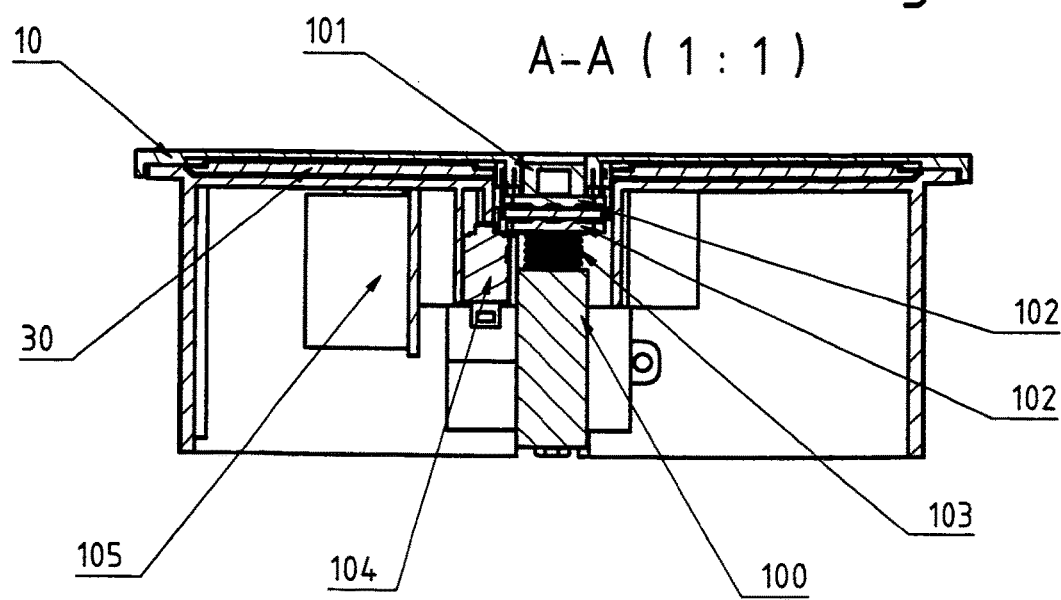
FIG. 22 shows the complete assembly of the third arrangement comprising the electric motor in a top sectional view.

FIGS. 20 to 22 show an alternative exemplary arrangement that is similar to previously described arrangements but with an electric motor. Again some common reference numbers for functionally similar elements to those described in prior arrangements are used to describe this arrangement.

FIG. 20 shows the housing bottom 20. An electric motor 100 is arranged thereon within the base housing 01. A control board 105 comprising a transformer, which is alternatively referred to herein as a control circuit, as well as a switch 104 is arranged within the base housing. A pressure spring 103 is arranged in operative connection with the electric motor 100. A running disk 102 is arranged between the pressure spring 103 and the rotary disk 30 which is alternatively referred to herein as a rotatable plate. Between the running disk 102 and the housing top part which is alternatively referred to as a housing outer over 10, an actuating button 101, which can be on or through the top side of the housing top part 10, can be operated via axial movement.

FIG. 21 shows the switch 104 for the electric motor 100, as well as the control circuit including board 105 comprising the transformer.

FIG. 22 illustrates the electric motor 100 with the actuating button 101, the running disk 102, the pressure spring 103, the switch 104, the control board 105 with the transformer, as well as the upper covering, the housing top part 10.

The release of the locking of the rotary disk 30 from a locked position takes place by pushing axially down on the actuating button 101 against the pressure of a pressure spring 90, which is arranged between the axial bearing of the rotary disk 30 and an electrical drive, the electric motor 100. When reaching the bottom extent of axial travel of the actuating button 101, the switch 104 is activated, and changes electrical condition which turns on the electric motor 100 responsive to the control circuit. The electric motor 100 rotates the rotary disk 30 from the socket blocked position into the socket access position and to operative engagement with a stop via an axial connection. When rotation of the rotary disk 30 stops due to operative engagement with the stop in the position, the current increases, the circuit detects the current increase, sets the switch 104 to off, turns off the supply of electricity to the electric motor 100, and reverses the polarity of the DC connections to the motor.

The pressure spring 90 axially pushes the rotary disk 30 into a locked position. The movement of the rotatable plate to the socket blocked position from the socket access position can take place in the same way as the opening, by pushing down the actuating button 101. The exemplary circuit is designed in such a way that, on the one hand, it realizes the reversal of the direction of rotation and, on the other, hand, represents a clamping protection.

LIST OF REFERENCE NUMERALS 01 base housing
02 socket unit
03 plug insertion aid
04 receptacle rotary disk
05 support edge
06 receiving opening housing fastening housing top part
10 housing top part
11 through openings housing top part
12 fastening dome
13 guide actuating button
14 stop actuating button
15 position securing ribs radial
20 housing bottom
21 rotary-pressure spring receptacle
30 rotary disk
31 through openings rotary disk
32 perforated screens
33 position securing grooves
34 axial enveloping body
35 pressure surface axial deflection
36 control gate
37 holding position axial
38 through duct
39 pressure spring receptacle
40 rotary spring receptacle rotary disk
41 support surface rotary sleeve
42 pressure surface axial deflection
43 axial guide groove
44 follower molding
45 actuating button
46 control segment
47 follower shoulder
48 stop plane
49 rotary sleeve guide
50 rotary sleeve
51 guide rib
52 guide pin
53 control segment receptacle
54 guide bore
58 pressure spring
59 pressure-rotary spring
60 actuating button
61 pressure spring guide
62 receptacle slide body
63 recess locking slide body
65 slide body
66 receptacle actuating button
67 locking lug actuating button
68 guide rib
69 stop plane housing top part
70 stop plane central axis body
74 central axis body
75 locking geometry central axis body
76 cylindrical guide in the slide body
77 cylindrical guide in helical gate
78 pin molding 79 inner axial guide
80 helical gate
81 rotary guide wall
82 follower receptacle
83 central axis body guide
84 helical guide
85 rotary spring receptacle
86 pressure spring stop
87 rotary spring guide
90 pressure spring actuating button
91 pressure spring rotary disk 30
92 rotary spring
100 electric motor
101 actuating button
102 running disk
103 pressure spring
104 switch
105 control board comprising transformer Thus the exemplary arrangements described herein achieve improved operation, eliminate difficulties encountered in the use of prior devices and systems, and achieve the useful results described herein.

In the foregoing description certain terms have been used for brevity, clarity and understanding. However no unnecessary limitations are to be implied therefrom because such terms are used for descriptive purposes and are intended to be broadly construed. Moreover the descriptions and illustrations herein are by way of examples and the inventive features are not limited to the exact features shown and described.

Further in the following claims any feature described as a means for performing a function shall be construed as encompassing any means known to those skilled in the art as being capable of carrying out the recited function, and shall not be deemed limited to only the particular means shown or described for performing the recited function in the foregoing description, or mere equivalents thereof.

It should be understood that features and/or relationships associated with one arrangement can be combined with features and/or relationships from another arrangement. That is various features and/or relationships from various arrangements can be combined in further arrangements. The inventive scope of the disclosure is not limited only to the particular arrangements that have been shown and described.

Having described features, discoveries and principals of the exemplary arrangements, the manner in which they are constructed and operated, and the advantages and useful results attained, the new and useful structures, devices, elements, arrangements, parts, combinations, systems, equipment, operations, methods, processes and relationships are set forth in the appended claims.

The invention claimed is:

1. An apparatus configured to provide temporary releasable electrical connections, comprising:
   a base housing, wherein the base housing includes an electrical socket, wherein the socket is configured to releasably electrically engage electrical connectors of electrically powered devices,
   a housing outer cover, wherein the housing outer cover is
      in fixed operative connection with the base housing,
      wherein the housing outer cover includes a socket access opening,
      wherein the socket access opening is in overlying corresponding aligned relation with the electrical socket in the base housing,
   a rotatable plate, wherein the rotatable plate
      is rotatable about an axis
      is in operatively supported connection with the base housing,
      extends axially intermediate of the electrical socket and the housing outer cover,
      includes a plate outer face and a plate opening,
         wherein the plate opening is disposed radially away from the axis,
      is configured to be rotationally movable between
         a socket blocked position, wherein in the socket blocked position the outer face is positioned in blocking relation with the socket access opening and blocks access to the electrical socket through the socket access opening, and
         a socket access position, wherein in the socket access position the plate opening is corresponding aligned relation with each of the socket and the socket access opening, whereby the electrical socket is accessible to receive an electrical connector through the socket access opening and the plate opening,
   an electric motor, wherein the motor is housed within the base housing,
   wherein the motor is
      in operative connection with the plate, and
      selectively operable to cause the plate to rotate about the axis,
   a manually actuatable button, wherein the manually actuatable button is externally accessible at least one of on or through the outer cover,
   an electrical switch, wherein the electrical switch is
      housed within the base housing, and
      in operative connection with the manually actuatable button, wherein manual actuation of the button is operative to cause a change in electrical condition of the switch,
   a control circuit, wherein the control circuit is
      housed within the base housing,
      in operative connection with the switch, and
      in operative connection with the motor,
   wherein control circuit is operative to cause
      with the plate in the socket blocked position, responsive at least in part to a change in electrical condition of the switch responsive to button actuation, the motor to cause rotational movement of the plate to the socket access position, and
      with the plate in the socket access position, responsive at least in part to a further change in electrical condition of the switch responsive to further button actuation, the motor to cause rotation of the plate to the socket blocked position.

2. The apparatus according to claim 1
   wherein the button is axially aligned and manually movable along the axis,
   wherein button actuation includes movement of the button toward the base housing.

3. The apparatus according to claim 1
   wherein the base housing includes a plurality of angularly disposed electrical sockets,
   wherein the housing outer cover includes a plurality of socket access openings, each of which socket access openings is in corresponding aligned relation with a respective electrical socket,
   wherein the rotatable plate includes a plurality of plate openings, wherein in the socket blocked position the outer face blocks access to each of the plurality of electrical sockets, and in the socket access position each plate opening is in corresponding aligned relation with a respective electrical socket and a respective socket access opening.

4. The apparatus according to claim 1
wherein the plate includes a perforated screen,
wherein in the socket blocked position the perforated screen is in aligned overlying relation with the electrical socket, and extends in flush relation with an outer surface of the housing outer cover that is in surrounding relation of the socket access opening.

5. The apparatus according to claim 1
and further comprising a spring housed in the base housing, wherein the spring is in operative connection with the plate and is operative to bias the plate axially toward the housing outer cover,
wherein the plate includes a perforated screen,
wherein in the socket blocked position the perforated screen is biased responsive to the spring to extend into the socket access opening.

6. The apparatus according to claim 1
and further comprising a spring housed in the base housing, wherein the spring is in operative connection with the plate and is operative to bias the plate axially toward the housing outer cover,
wherein the plate includes a perforated screen,
wherein in the socket blocked position the perforated screen is biased responsive to the spring to extend into the socket access opening,
wherein the button is in operative connection with the plate, wherein button actuation is operative to move the plate axially against the biasing force of the spring and cause the perforated screen to be disposed axially away from the socket access opening.

7. The apparatus according to claim 1
wherein the manually actuatable button is in operative connection with one of a locking projection or recess,
wherein in an unactuated position of the button, the at least one locking projection or recess is operative to prevent rotation of the plate relative to the base housing, and
wherein in an actuated position of the button the at least one locking projection or recess is not operative to prevent rotation of the plate relative to the base housing.

8. The apparatus according to claim 1
wherein the electrical socket includes at least one of the household current socket and a USB port.

9. The apparatus according to claim 1
wherein the button is axially aligned and axially movable along the axis,
wherein the button is biased outwardly toward the housing outer cover by a spring,
wherein movement of the button toward the base housing along the axis against the biasing force of the spring is operative to change the electrical condition of the switch.

10. The apparatus according to claim 1
wherein the control circuit is operative to reverse electrical polarity to the motor when the plate rotates to the socket blocked position and when the plate rotates to the socket access position.

11. The apparatus according to claim 1
and further comprising:
a spring, wherein the spring is coaxial with the axis,
a running disc, wherein the running disc is operatively biased by the spring to engage the plate,
wherein the button is axially positioned, movable along the axis and in operative engagement with the spring,
wherein axial movement of the button toward the base housing is operative to cause the plate and the running disc to move axially toward the base housing against the biasing force of the spring.

12. The apparatus according to claim 1
wherein the button is axially centered and is movable along the axis,
and further comprising:
a spring, wherein the spring is in operative connection with the button and biases the button axially outward away from the base housing,
wherein in at least one of the socket blocked position and the socket access position the spring causes the button to move axially outward into a locked position wherein rotation of the plate relative to the base housing is prevented in the locked position of the button.

13. The apparatus according to claim 1
wherein the button is axially centered and is movable along the axis,
and further comprising:
a spring, wherein the spring is in operative connection with the button and biases the button axially outward away from the base housing,
wherein in at least one of the socket blocked position and the socket access position the spring causes the button to move axially outward into a locked position, wherein rotation of the plate relative to the base housing is prevented in the locked position of the button,
wherein axial movement of the button toward the base housing is operative to cause the button to be moved away from the locked position, wherein the plate is rotatable relative to the base housing and to cause the change in the electrical condition of the switch.

14. The apparatus according to claim 1
and further comprising a stop, wherein the plate is operatively engageable with the stop,
wherein the stop is operable to operatively engage and stop rotation of the plate when plate rotation reaches at least one of the socket blocked position and the socket access position,
wherein the circuit is operative
to detect a motor current increase responsive to the plate being in operative engagement with the stop and responsive at least in part to the detection of the current increase to discontinue delivery of electricity to the motor.

15. The apparatus according to claim 1
and further comprising a stop, wherein the plate is operatively engageable with the stop,
wherein the stop is operable to operatively engage and stop rotation of the plate when plate rotation reaches at least one of the socket blocked position and the socket access position,
wherein the circuit is operative
to detect a motor current increase responsive to the plate being in operative engagement with the stop and responsive at least in part to detection of the current increase to discontinue delivery of electricity to the motor and to cause polarity of electrical connections to the motor to be reversed.

16. An apparatus configured to provide temporary releasable electrical connections, comprising:
- a base housing, wherein the base housing includes an electrical socket, wherein the electrical socket is configured to releasably electrically engage electrical connectors of electrically powered devices,
- a housing outer cover, wherein the housing outer cover outwardly overlies and is in fixed operative connection with the base housing,
  - wherein the housing outer cover includes a socket access opening that is in corresponding aligned relation with the electrical socket in the base housing,
- a plate, wherein the plate is movably mounted in operatively supported connection with the base housing,
- wherein the plate is movable between the electrical socket and the housing outer cover,
- wherein the plate is movable between
  - a socket blocked position, wherein in the socket blocked position the plate is positioned between the socket access opening and the electrical socket and blocks access to the electrical socket through the socket access opening, and
  - a socket access position, wherein in the socket access position of the plate the electrical socket is accessible to receive an electrical connector through the socket access opening and to enable the electrical connector to engage the electrical socket,
- an electric motor, wherein the electric motor is housed within the base housing,
- wherein the motor is
  - in operative connection with the plate, and is selectively operable to cause the plate to move between the socket blocked position and the socket access position,
- a manually actuatable button, wherein the manually actuatable button is externally accessible at least one of on or through the outer cover,
- an electrical switch, wherein the electrical switch
  - is housed within the base housing, and
  - in operative connection with the manually actuatable button, wherein manual button actuation is operative to cause a change in electrical condition of the switch,
- a control circuit, wherein the control circuit is
  - housed within the base housing,
  - in operative connection with the switch, and
  - in operative connection with the motor,
- wherein the control circuit is operative to cause
  - with the plate in the socket blocked position, responsive at least in part to a change in electrical condition of the switch responsive to button actuation, the motor to cause movement of the plate to the socket access position, and
  - with the plate in the socket access position, responsive at least in part to a further change in electrical condition of the switch responsive to further button actuation, the motor to cause movement of the plate to the socket blocked position.

17. The apparatus according to claim 16
wherein the plate is rotatable about an axis, and includes a plate opening through the plate,
wherein in the socket blocked position the plate opening is angularly disposed away from alignment with the electrical socket and the socket access opening,
and wherein in the socket access position the plate opening is in corresponding aligned relation with each of the electrical socket and the socket access opening.

18. The apparatus according to claim 17
wherein the button is axially aligned and manually movable along the axis,
wherein button actuation includes movement of the button toward the base housing.

19. The apparatus according to claim 18
wherein the base housing includes a plurality of angularly disposed electrical sockets,
wherein the housing outer cover includes a plurality of socket access openings, each of which socket access openings is in corresponding overlying aligned relation with one respective electrical socket,
wherein the rotatable plate includes a plurality of plate openings,
wherein in the socket blocked position the plate blocks access to each of the plurality of electrical sockets through any of the socket access openings, and in the socket access position each plate opening is in corresponding aligned relation with a respective electrical socket and a respective socket access opening.

20. The apparatus according to claim 19
and further comprising a stop, wherein the plate is operatively engageable with the stop,
wherein the stop is operable to operatively engage and stop rotation of the plate when plate rotation reaches at least one of the socket blocked position and the socket access position,
wherein the circuit is operative
  to detect a motor current increase responsive to the plate being in operative engagement with the stop, and responsive at least in part to the detection of the current increase to discontinue delivery of electricity to the motor.

* * * * *